(12) United States Patent
Ozugur

(10) Patent No.: US 8,443,092 B2
(45) Date of Patent: May 14, 2013

(54) PRESENTITY FILTERING FOR USER PREFERENCES

(75) Inventor: Timucin Ozugur, Garland, TX (US)

(73) Assignee: Alcatel Lucent, Paris (FR)

( * ) Notice: Subject to any disclaimer, the term of this patent is extended or adjusted under 35 U.S.C. 154(b) by 3260 days.

(21) Appl. No.: 10/744,437

(22) Filed: Dec. 23, 2003

(65) Prior Publication Data

US 2005/0135240 A1 Jun. 23, 2005

(51) Int. Cl.
*H04M 3/42* (2006.01)
*G06F 15/16* (2006.01)
*G06F 15/177* (2006.01)

(52) U.S. Cl.
USPC ........ 709/229; 709/206; 709/220; 455/414.2; 455/416; 455/419

(58) Field of Classification Search .................. 370/229, 370/235, 463; 709/227, 204–207, 228–229; 709/220; 455/414.2, 416, 419
See application file for complete search history.

(56) References Cited

U.S. PATENT DOCUMENTS

| | | | | |
|---|---|---|---|---|
| 6,477,150 | B1 * | 11/2002 | Maggenti et al. | 370/312 |
| 6,807,423 | B1 * | 10/2004 | Armstrong et al. | 455/440 |
| 7,162,474 | B1 * | 1/2007 | Harker et al. | 707/694 |
| 7,313,617 | B2 * | 12/2007 | Malik et al. | 709/225 |
| 7,337,210 | B2 * | 2/2008 | Barsness | 709/204 |
| 2003/0028597 | A1 * | 2/2003 | Salmi et al. | 709/204 |
| 2003/0065788 | A1 | 4/2003 | Salomaki | |
| 2003/0154293 | A1 | 8/2003 | Zmolek | |
| 2004/0030750 | A1 * | 2/2004 | Moore et al. | 709/204 |
| 2004/0122896 | A1 * | 6/2004 | Gourraud | 709/204 |
| 2004/0122977 | A1 * | 6/2004 | Moran et al. | 709/246 |
| 2004/0267885 | A1 * | 12/2004 | Zimmermann et al. | 709/206 |
| 2005/0132288 | A1 * | 6/2005 | Kirn et al. | 715/700 |
| 2006/0259956 | A1 * | 11/2006 | Diacakis et al. | 726/2 |

OTHER PUBLICATIONS

"Requirements for Filtering of Watcher Information", draft-kiss-simple-winfo-filter-reqs-00.txt. Internet Draft, Kiss et al., May 2003, Work in progress, 18 pps.
"A Watcher Information Event Template-Package for SIP", draft-ietf-simple-winfo-package-05.txt. Internet Draft, Rosenberg, Jan. 2003, Work in progress, 40 pps.
Sugano, et al.; Common Presence and Instant Messaging (CPIM) Presence Information Data Format; IETF Internet Draft; May 2002; pp. 1-23.
Rosenberg, J.; Extensible Markup Lanuage (XML) Configuration Access Protocol (XCAP) Usages for Setting Presence Authorization; IETF Internet Draft; Jun. 23, 2003; pp. 1-41
Rosenberg, et al.; Requirements for Manipulation of Data Elements in Session Initiation Protocol (SIP) for Instant Messaging and Presence Leveraging Extensions (SIMPLE) systems; IETF Internet Draft; Apr. 16, 2003; pp. 1-15.
Khartabil, et al.; Requirements for Presence Specific Event Notification Filtering; IETF Internet Draft; Aug. 14, 2003, pp. 1-12.

(Continued)

*Primary Examiner* — Michael Thier
*Assistant Examiner* — Awet Haile
(74) *Attorney, Agent, or Firm* — Garlick & Markison; Holly L. Rudnick

(57) ABSTRACT

The adjustability of a watcher's level of access to a presentity's presence information is enhanced by providing for the filtering of the presence information based on information that is provided by a source other than the watcher.

19 Claims, 3 Drawing Sheets

OTHER PUBLICATIONS

Lonnfors, et al.; Partial Notification of Presence Information; IETF Internet Draft; Jun. 19, 2003; pp. 1-20.

Rosenberg, et al.; An Extensible Markup Language (XML) Based Format for Watcher Information; IETF Internet Draft; Jan. 31, 2003; pp. 1-14.

Roach, A. B., Session Initiation Protocol (SIP)—Specific Event Notification; IETF Network Working Group; RFC 3265; Jun. 2002; pp. 1-38.

Rosenberg, et al.; SIP: Session Initiation Protocol; IETF Network Working Group; RFC 3261; Jun. 2002; pp. 1-269.

* cited by examiner

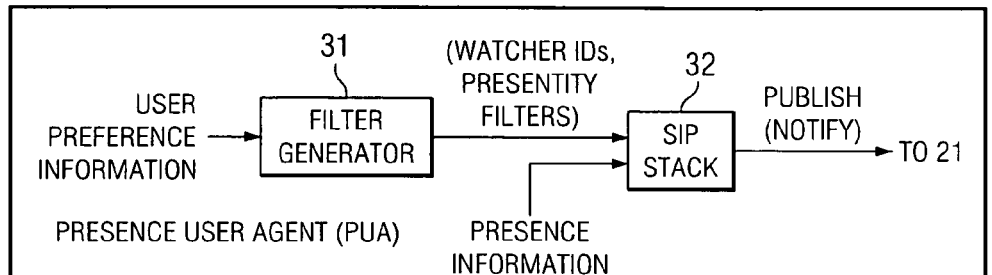
*FIG. 3*
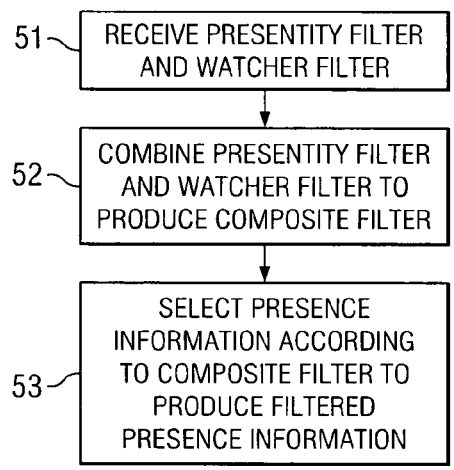
*FIG. 5*
- POLICY CLASS 1 (HIGH: FULL COVERAGE OF THE PRESENTITY DATA)
- POLICY CLASS 2
- POLICY CLASS 3
    ⋮
- POLICY CLASS m (LOW: LIMITED COVERAGE OF THE PRESENTITY DATA)
*FIG. 6*

PRESENTITY FILTERING FOR USER PREFERENCES

FIELD OF THE INVENTION

The invention relates generally to communication via a data network and, more particularly, to communication of information indicative of the presence state of a network user.

BACKGROUND OF THE INVENTION

The following documents are incorporated herein by reference:

Rosenberg, J., etc., SIP: Session Initiation Protocol, RFC 3261;

Rosenberg, J. "A Watcher Information Event Template-Package for SIP", draft-ietf-simple-winfo-package-05.txt. Internet Draft, Jan. 2003, Work in progress;

Rosenberg, J., "An XML Based Format for Watcher Information", draft-ietf-impp-cpim-pidf-05.txt. Internet Draft, Jan. 2003, Work in Progress.

Roach, A., "SIP-Specific Event Notification", RFC 3265, Internet Engineering Task Force, Jun. 2002; and Kiss, K. et al., "Requirements for Filtering of Watcher Information", draft-kiss-simple-winfo-filter-reqs-00.txt. Internet Draft, Feb. 2003, Work in progress.

With today's widespread use of the Internet as a primary communication medium, data communication devices are now being designed so that they are capable of communicating over packet-switched networks. For instance, telephones, pagers, cell phones, handheld computers, and even fax machines can now be accessed and controlled from the Internet. Communication over a packet-switched network using communication devices that traditionally communicate over a circuit-switched telephone network is generally known as network telephony, or IP telephony when an IP network is involved.

Various types of user communication devices (e.g., a cell phone, laptop or handheld PC, desktop PC) can identify themselves to the network using a suitable identifier (e.g., username@a.com). "Presence" refers to, for example, the availability, proximity, activity level or operating state of a user on a network. The ability for users to monitor each other's presence is a feature offered in connection with many applications that support network telephony. For example, instant messaging applications such as MSN or Yahoo have an "available buddy" feature, in which a user of the application can determine whether select users are available for engaging in communication. The data retrieved and returned to the buddy list, e.g. "John OFFLINE" or "Susan ACTIVE," is known as "presence information," and is generally maintained by a presence server in the data network, often a dedicated server. Typically, the presence server supports network telephony protocols such as the session initiation protocol (SIP). Users can register their communication devices with the presence server in order to have their presence maintained and to allow various programs on the network to facilitate network telephony services. A first device user wishing to detect the presence of a second device user does so by "subscribing" with the presence server, such as via a SIP SUBSCRIBE message. The presence server intermediates between the first device user (also known as the watcher or subscriber), and the second device user to facilitate the communication of the second device user's presence information to the first device user.

The ability of a presence server to accurately determine and maintain presence information for one or more users significantly enhances communication and task completion over the network. For example, a very mobile user may only be on the network at certain times throughout the day, and may be accessing the network from varying locations. By subscribing as a watcher of this mobile user, it becomes possible for another user to detect the presence of the mobile user during the times at which the mobile user's device is actually connected to the network. So, when the mobile user is present, the watcher can correspond instantly with the mobile user, for example via a chat session or videoconferencing call, as opposed to resorting to a non-real-time communication such as e-mail messaging. Hence, presence is an important factor for facilitating communication between users.

FIG. 1 diagrammatically illustrates an example of a conventional arrangement wherein a presence server 11 provided in a data network (e.g., Internet) provides to the user of a first communication device 13 information indicative of the presence state of a second communication device 15. The device 13 is also referred to as the subscriber or watcher, and the device 15 includes a presence user agent (PUA) or presentity. The presence server 11 includes a policy engine which is responsive to information received from the watcher/subscriber 13 for determining what portion of the presence information of the device 15 (provided to server 11 by device 15 in a SIP PUBLISH message) will be provided to the watcher/subscriber 13. The subscriber 13 utilizes a SIP SUBSCRIBE message to provide to the presence server 11 watcher filter information which can limit the amount of presence information that the presence server 11 will provide to the watcher 13 in a SIP NOTIFY message. Thus, the watcher can decide which presence information of the presentity device 15 will be received by the watcher 13 in a NOTIFY message.

The watcher filtering capability can be useful, for example, if the subscriber 13 is a mobile wireless access device. This type of device typically includes characteristics such as high latency, low bandwidth, low data processing capability, small visual display and limited battery power. Therefore, such mobile wireless access devices can benefit from the ability to filter the presence information that the device 15 provides to the presence server 11 in a SIP PUBLISH message. Based on the watcher filter information provided by the watcher/subscriber 13, the policy engine residing in the presence server 11 will filter (in accordance with the watcher filter) the presence information provided by the presentity 15, and will then provide this filtered information to the watcher/subscriber 13 in a NOTIFY message. The presence server updates the presence information to the watcher 13 in an appropriate NOTIFY message every time there is a change in the state of the watcher-filtered presence information. Also, when a NOTIFY message to the watcher 13 is triggered, communication resources can be conserved by including in the NOTIFY message only the changed portion (or portions) of the watcher-filtered presence information that triggered the new NOTIFY message. In some cases, the watcher's filter will filter out most of the presence information provided by the presentity 15.

For any given watcher, the presentity user can give the presence server 11 a "yes" or "no" instruction as to whether or not that watcher can even receive any of the presentity's presence information, regardless of watcher-filtering. A "yes" instruction permits the watcher to receive presence information, filtered by any applicable watcher filter. A "no" instruction prevents the watcher from receiving any presence information, regardless of any applicable watcher filtering.

In view of the foregoing, it can be seen that only the watcher/subscriber can adjust the level of its access to presence information.

Exemplary embodiments of the invention can provide an enhanced capability of adjusting the watcher's level of access to presence information by providing for the filtering of the presence information based on information provided by a source other than the watcher.

BRIEF DESCRIPTION OF THE DRAWINGS

FIG. 3 diagrammatically illustrates exemplary embodiments of the presentity device of FIG. 2.

FIG. 5 illustrates exemplary operations which can be performed by the embodiments of FIGS. 2-4.

FIG. 6 illustrates an example of a hierarchical policy class list that can be implemented by exemplary presence server embodiments according to the invention.

DETAILED DESCRIPTION

Figure 1:
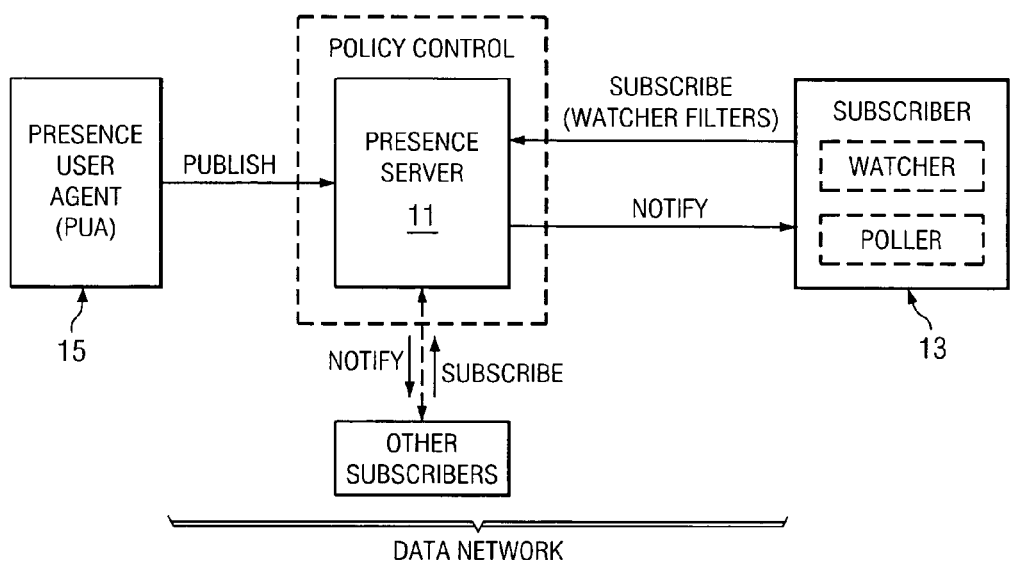
FIG. 1 diagrammatically illustrates an example of a conventional arrangement for providing presence information to a watcher.
Figure 2:
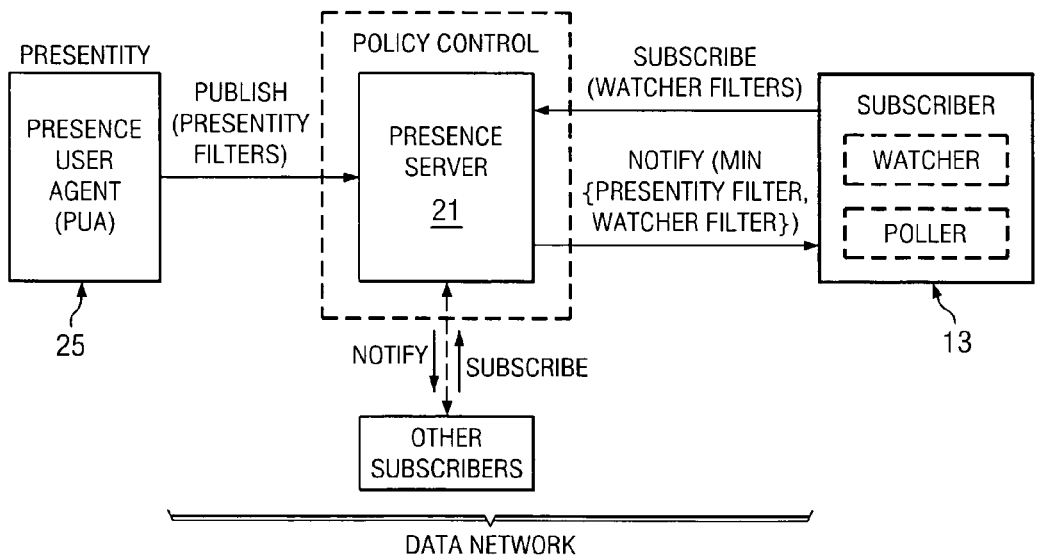
FIG. 2 diagrammatically illustrates an arrangement for providing presence information to a watcher according to exemplary embodiments of the invention.

According to exemplary embodiments of the invention, the user of the presentity device may utilize a presentity filter to set any desired preference for any given watcher. Presentity filters can be defined for respective watchers on an individual basis, or a single presentity filter can also be defined for a group of watchers. FIG. 2 diagrammatically illustrates exemplary embodiments of an arrangement according to the invention wherein a watcher/subscriber receives presence information about a desired presentity, which presence information has been filtered according to a presentity filter produced by the presentity device 25. The presentity device 25 can use a PUBLISH message to pass to the presence server 21 presentity filters for a plurality of watchers/subscribers, or the presentity device 25 can use respective NOTIFY messages to transmit respective presentity filters for respective watchers/subscribers.

In various embodiments, either of the devices 25 or 13 can be any one of, for example, a telephone device, a handheld computer device, a laptop computer device or a desktop computer device, and either of the devices 25 or 13 can access the data network via any one of, for example, a wired, wireless or optical fiber communication connection.

The presence server 21 stores the received presentity filters and modifies its policy engine according to these presentity filters. In some embodiments, when the presence state of the presentity 25 changes, the presence server 21 can, for each watcher, compare the watcher's filter to the presentity filter for that watcher, and then transmit to the watcher only the presence information that is permitted by both filters. This is represented in FIG. 2 by the NOTIFY message carrying "min [presentity filter, watcher filter]", which represents the minimum amount of information permitted by application of both the presentity filter and the watcher filter. As one example, if a watcher's filter indicates that the watcher only wishes to receive business related presence information during normal business hours (e.g., 9 a.m. to 5 p.m.), and if the presentity filter for that watcher indicates that the watcher is to receive the business related presence information only between the hours of 10 a.m. and 2 p.m., then the policy engine within the presence server 21 will combine the presentity filter and the watcher filter with the result that the watcher will receive business related presence information only between the hours of 10 a.m. and 2 p.m. Thus, in such embodiments, to the extent that the presentity filter is more restrictive than the watcher filter regarding how much presence information the watcher will receive, the presentity filter takes precedence over the watcher filter.

Some examples of presentity filters that can be implemented by the user of the presentity device 25 include: the user's spouse as a watcher could be permitted to receive all available presence information; the user's secretary as a watcher could be permitted to receive all business related presence information including caller ID; the user's co-worker as a watcher could be permitted to receive some portion of the business related presence information during normal business hours; one of the user's customers as a watcher could be permitted to receive business related presence information only when the user is in the office; another of the user's customers as a watcher could be permitted to receive business related presence information only when the user is not in the office; and if the watcher is a buddy of the user but not a co-worker of the user, the watcher could be permitted to receive only non-business related presence information after business hours.

As illustrated in FIG. 6, the presence server 21 of FIG. 2 can maintain a hierarchical list of policy classes which basically represents the various levels of presentity filtering that have been defined by the presentity device 25. In the example of FIG. 6, filter (or policy) class 1 permits the highest access to the pertinent presence information. Policy classes 2, 3 . . . m can define filters which provide access that is incrementally reduced with respect to the highest access defined by policy class 1, such that policy class 2 provides incrementally less access than policy class 1, policy class 3 provides incrementally less access than policy class 2, and so on through policy class m, which permits the least access to presence information. Considering again the example of providing all of the presentity user's business related presence information during normal business hours, one example of a hierarchical policy class list could be that policy class 1 provides access to all business related presence information from 9 a.m. to 5 p.m., policy class 2 provides access to all business related presence information from 9 a.m. to 4 p.m., policy class 3 provides access to all business related presence information from 9 a.m. to 3 p.m., and so on through policy class m which provides access to all business related information from 9 a.m. to noon.

In order to conserve resources in the communication of presentity filters from the presentity device 25 to the presence server 21, once the presentity device 25 has communicated to the presence server 21 the definition of the full coverage policy class 1, the remaining policy classes in the hierarchical list can be communicated from the presentity 25 to the presence server 21 by simply communicating the difference between the policy class that is currently being communicated and a policy class that has already been communicated. In the example given above, after policy class 1 has been defined as access to all business related presence information from 9 a.m. to 5 p.m., policy class 2 can be communicated from the presentity 25 to the presence server 21 by simply indicating that policy class 2 differs from policy class 1 in that the availability time period of policy class 2 will end one hour earlier than the period in policy class 1. Similarly, policy class 3 can be communicated to the presence server by simply indicating that the only difference from class 2 is that the availability time period will end one hour earlier than in class 2. Once the presentity 25 has defined various presentity filters (policy classes) for respective watchers, then as additional watchers subsequently subscribe to the presentity's presence information, the presentity can, as appropriate, simply communicate to the presence server that the various subsequent watcher/subscribers can be assigned to respective ones of the already defined presentity filters (policy classes). So any one of the policy classes of FIG. 6 may have plural watchers assigned thereto.

FIG. 3 diagrammatically illustrates exemplary embodiments of the presentity device 25 of FIG. 2. The user of the presentity device inputs her preferences to a filter generator 31 which is responsive to the preferences to produce presentity filter information for transmission to the presence server 21 (see also FIG. 2). In some embodiments, the filter generator 31 can use conventional techniques to produce the presentity filter information from the user preferences in generally the same manner as a conventional watcher device produces its watcher filter in response to the watcher's preferences. The presentity filter information for any given watcher is input to a conventional SIP stack 32. This SIP stack 32 produces a PUBLISH message (or alternatively a NOTIFY message) in which the presentity filter(s) and corresponding watcher identifier(s) is/are transmitted to the presence server 21. The device's presence information is also input to the SIP stack 32 for transmission to the presence server 21 in a corresponding PUBLISH message. Such transmission of presence information to a presence server is well-known in the art.

Figure 4:
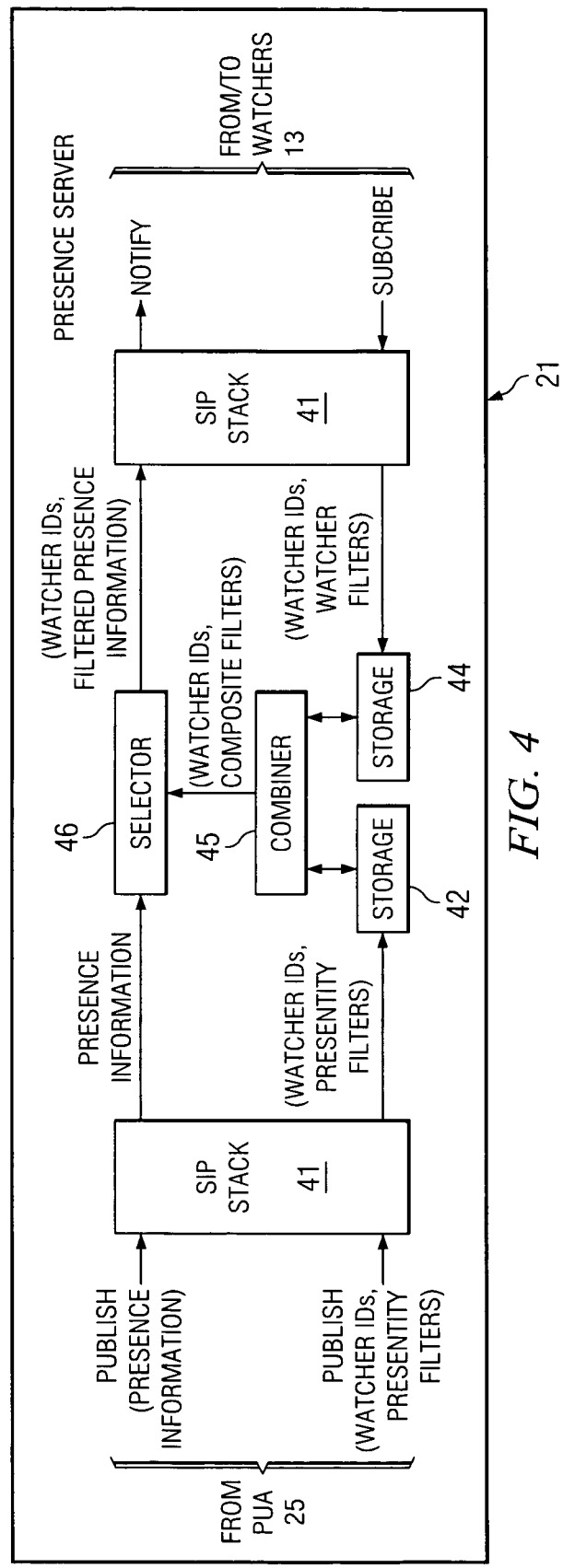
FIG. 4 diagrammatically illustrates exemplary embodiments of the presence server of FIG. 2.

FIG. 4 diagrammatically illustrates exemplary embodiments of the presence server 21 of FIG. 2. The two aforementioned types of PUBLISH messages (for presence information and presentity filters) produced by the presentity device 25 traverse the data network between the presentity device 25 and the presence server 21 (see also FIG. 2), and are input to a conventional SIP stack 41 of the presence server 21. The SIP stack 41 extracts the presence information from its corresponding PUBLISH message. The SIP stack 41 also extracts the watcher identifiers (IDs) and corresponding presentity filters from their corresponding PUBLISH message. Alternatively, the SIP stack 41 can extract each watcher identifier and corresponding presentity filter from a respectively corresponding NOTIFY message. The watcher identifiers and corresponding presentity filters output from the SIP stack 41 are stored in presentity filter storage 42.

SIP SUBSCRIBE messages traverse the data network from various watcher devices to the presence server 21 (see also FIG. 2), arriving at the SIP stack 41. Each watcher provides such a SUBSCRIBE message including its watcher identifier and its desired watcher filter. The SIP stack 41 extracts from each SUBSCRIBE message the watcher identifier and the corresponding watcher filter information. Each received watcher identifier and corresponding watcher filter is stored in watcher filter storage 44.

A combiner 45 can retrieve presentity filters from presentity filter storage 42 and watcher filters from watcher filter storage 44. For each watcher/subscriber, the combiner 45 obtains the corresponding presentity filter and the corresponding watcher filter, and combines the two filters to produce a resulting composite filter based on information in both the presentity filter and the watcher filter. As discussed above, in some exemplary embodiments, the combiner 45 produces a composite filter that permits access only to presence information permitted by both the presentity filter and the watcher filter, namely min [presentity filter, watcher filter]. Other embodiments combine the presentity filter and the watcher filter differently. For example, if the watcher filter calls for receiving certain presence information only between the hours of 9 a.m. and 5 p.m., and if the presentity filter limits availability of that certain presence information to the hours of 11 a.m. through 3 p.m., the combiner 45 can produce a composite filter that permits the watcher to receive that certain presence information from 10 a.m. to 4 p.m. Thus, in this example, the composite filter is defined intermediately between the presentity filter and the watcher filter.

The composite filter information produced by the combiner 45 is applied to a presence information selector 46, which also receives the presence information from the SIP stack 41. The presence information selector 46 is responsive to the composite filter information to select for each watcher the presence information that is permitted for that watcher by its corresponding composite filter. For each watcher, the presence information selector 46 outputs the corresponding filtered presence information specified by the corresponding composite filter information produced by the combiner 45.

The presentity filter storage 42, watcher filter storage 44, combiner 45 and presence information selector 46 are thus components of a policy engine which, in response to the received presentity filter information and watcher filter information for a given watcher, produces the appropriate filtered presence information for that particular watcher.

FIG. 5 illustrates exemplary operations which can be performed by the embodiments of FIGS. 2-4 for a given watcher/subscriber. After receiving the presentity filter and watcher filter at 51, these filters are combined at 52 to produce the composite filter for the watcher/subscriber. At 53, the presence information is selected according to the composite filter to produce appropriately filtered presence information for transmission to the watcher/subscriber.

It will be evident to workers in the art that the embodiments described above with respect to FIGS. 2-6 can be readily implemented by suitable modifications in software, hardware, or a combination of software and hardware in conventional presentity devices and presence servers.

Although exemplary embodiments of the invention are described above in detail, this does not limit the scope of the invention, which can be practiced in a variety of embodiments.

What is claimed is:

1. A method of communicating to a first communication device presence information associated with a second communication device, comprising:

providing available presence information associated with the second communication device;

receiving from a source other than the first communication device first limitation information which indicates that the first communication device will be permitted to obtain less than all of said available presence information;

receiving from the first communication device second limitation information which indicates that the first communication device is to receive less than all of said available presence information; and in response to said first limitation information and said second limitation information, providing less than all of said available presence information to the first communication device without providing the remainder of said available presence information to the first communication device;

wherein said first limitation information includes information which indicates that a plurality of communication devices will be permitted to obtain respective amounts of said available presence information that differ from one another and are less than all of said available presence information, wherein said first limitation information defines a first amount of said available presence information that is to be received by one of said communication devices, and also defines a second amount of said available presence information, which is to be received by another of said communication devices, as a difference relative to the first amount.

2. The method of claim 1, wherein said source is the second communication device.

3. The method of claim 1, wherein said first limitation information indicates that the first communication device is to receive less of said available presence information than does said second limitation information, and wherein said step of providing less than all includes providing an amount of said available presence information indicated by said first limitation information.

4. The method of claim 1, wherein said second limitation information indicates that the first communication device is to receive less of said available presence information than does said first limitation information, and wherein said step of providing less than all includes providing an amount of said available presence information indicated by said second limitation information.

5. The method of claim 1, wherein said receiving step includes receiving said first limitation information via SIP messaging.

6. The method of claim 1, wherein said available presence information includes one of information indicative of whether the second communication device is currently involved in a communication session, and information which identifies a further communication device involved in said communication session.

7. The method of claim 1, including receiving from the first communication device second limitation information which indicates that the first communication device is to receive less than all of said available amount of presence information, and wherein said first limitation information and said second limitation information are temporal limitations which specify predetermined periods of time during which the first communication device cannot receive said available presence information.

8. The method of claim 1, wherein each of the first and second communication devices is one of a telephone device, a handheld computer device, a laptop computer device and a desktop computer device.

9. The method of claim 1, wherein said presence information includes one of availability, proximity, activity level and operating state of the second communication device with respect to a data network used by the first communication device.

10. A data communication apparatus, comprising:
an output for providing to a data network available presence information associated with the data communication apparatus;
an input for receiving preference information which indicates a preference regarding how much of said available presence information is to be obtained by another data communication apparatus, said preference information including first preference information sent from the another communication apparatus that indicates that the another communication apparatus is to receive less than all of said available presence information;
an information generator coupled to said input for providing in response to said preference information limitation information which indicates that the another communication apparatus is to receive less than all of said available presence information without receiving the remainder of said available presence information; and
said output coupled to said information generator for outputting said limitation information to the data network;, wherein said limitation information indicates that a plurality of communication apparatus will be permitted to obtain respective amounts of said available presence information that differ from one another and are less than all of said available presence information, wherein said limitation information defines a first amount of said available presence information that is to be received by a one of the communication apparatus, and also defines a second amount of said available presence information, which is to be received by another of the communication apparatus, as a difference relative to the first amount.

11. The apparatus of claim 10, wherein said preference information further includes second preference information that is provided by a user of the apparatus.

12. The apparatus of claim 10, including a SIP interface coupled between said information generator and said output for providing at said output a SIP message including said limitation information.

13. The apparatus of claim 10, provided as one of a telephone apparatus, a handheld computer apparatus, a laptop computer apparatus and a desktop computer apparatus.

14. A presence server apparatus for providing to a first communication device presence information associated with a second communication device, comprising:
an input for receiving from the second communication device available presence information associated with the second communication device;
said input further for receiving from a source other than the first communication device first limitation information which indicates that the first communication device will be permitted to obtain less than all of said available presence information;
said input further for receiving from the first communication device second limitation information which indicates that the first communication device is to receive less than all of said available presence information; and
a policy engine coupled to said input and responsive to said first limitation information and said second limitation information for outputting less than all of said available presence information to the first communication device without outputting a remainder of said available presence information to the first communication device;
wherein said first limitation information indicates that a plurality of communication devices will be permitted to obtain respective amounts of said available presence information that differ from one another and are less than all of said available presence information, said policy engine for arranging said amounts hierarchically according to incremental differences therebetween;
wherein said first limitation information defines a first amount of said available presence information that is to be received by one of the communication devices, and also defines a second amount of said available presence information, which is to be received by another of the communication devices, as a difference relative to the first amount.

15. The apparatus of claim 14, wherein said source is the second communication device.

16. The apparatus of claim 14, wherein said policy engine includes a combiner coupled to said input for combining said first limitation information and said second limitation information to produce composite limitation information, said policy engine further including a selector coupled to said input for receiving said available presence information, said selector further coupled to said combiner and responsive to said composite limitation information for selecting less than all of said available presence information from said available presence information.

17. The apparatus of claim 16, wherein one of said first limitation information and said second limitation information indicates that the first communication device is to receive a smaller amount of said available presence information than does the other of said first limitation information and said second limitation information, and wherein said selector is responsive to said composite limitation information for selecting for output to the first communication device said smaller amount of said available presence information indicated by said one of said first limitation information and said second limitation information.

18. The apparatus of claim 14, wherein said input is for receiving said first limitation information in a SIP message, and including a SIP interface coupled between said input and said policy engine.

19. The apparatus of claim 14, wherein said policy engine is for arranging said amounts proceeding from a largest of said amounts to a next-largest of said amounts and ultimately to a smallest of said amounts.

\* \* \* \* \*